United States Patent

Manusch et al.

[11] Patent Number: 6,145,770
[45] Date of Patent: Nov. 14, 2000

[54] FRICTION COUPLING FOR THE TORQUE-LIMITING TRANSMISSION OF FORCE BETWEEN A COIL CORE FOR WINDING OR UNWINDING A TAPE AND A ROTARY SUPPORT

[75] Inventors: Christoph Manusch, Hemmingen; Wulf Herrmannsen, Ronnenberg; Olaf Balke, Wunstorf, all of Germany

[73] Assignee: Pritt Produktionsgesellschaft mbH, Hannover, Germany

[21] Appl. No.: 09/125,607

[22] PCT Filed: Feb. 13, 1997

[86] PCT No.: PCT/EP97/00653

§ 371 Date: May 12, 1999

§ 102(e) Date: May 12, 1999

[87] PCT Pub. No.: WO97/30922

PCT Pub. Date: Aug. 28, 1997

[30] Foreign Application Priority Data

Feb. 22, 1996 [DE] Germany .......................... 196 06 626

[51] Int. Cl.⁷ .......................... B65H 23/08; B65H 18/08; B65C 11/00
[52] U.S. Cl. ..................... 242/422.4; 242/538.1; 242/545.1; 156/577; 464/30
[58] Field of Search ............................ 242/394.1, 396.6, 242/538.1, 545.1, 422.4; 156/577; 188/83; 464/30, 34

[56] References Cited

U.S. PATENT DOCUMENTS

| 2,160,611 | 5/1939 | Alexander ................................. 464/30 |
| 3,312,410 | 4/1967 | Strothmann .......................... 242/422.4 |
| 3,770,221 | 11/1973 | Stern ..................................... 242/422.4 |
| 4,063,690 | 12/1977 | Ouchi .................................... 242/394.1 |
| 4,096,021 | 6/1978 | Pool et al. ............................... 156/527 |
| 4,851,076 | 7/1989 | Manusch et al. ........................ 156/577 |
| 4,891,090 | 1/1990 | Lorincz et al. ........................... 156/577 |
| 5,044,573 | 9/1991 | LeCompte ............................. 242/422.4 |
| 5,049,229 | 9/1991 | Czech .................................... 156/577 |
| 5,150,851 | 9/1992 | Manusch et al. ..................... 242/538.1 |
| 5,242,154 | 9/1993 | Schmidt ................................... 464/34 |
| 5,379,477 | 1/1995 | Tamai et al. ......................... 15/104.94 |
| 5,899,811 | 5/1999 | Kishibuchi et al. ..................... 464/30 |
| 5,915,642 | 6/1999 | Davis .................................... 242/422.4 |

FOREIGN PATENT DOCUMENTS

| 0 556 406 | 8/1993 | European Pat. Off. . |
| 28 11 842 | 9/1978 | Germany . |
| 3900156 | 7/1990 | Germany . |
| 39 11 402 | 10/1990 | Germany . |
| 4034145 | 10/1991 | Germany . |

Primary Examiner—John M. Jillions
Attorney, Agent, or Firm—Wayne C. Jaeschke; Stephen D. Harper

[57] ABSTRACT

In a friction coupling for the torque-limiting transmission of force between a core of a coil for winding or unwinding a tape and a rotary support for said core there is a first coupling component with an annular cross-section and a second coupling component taking the form of a moulding, in which the annular coupling component is in frictional engagement at several spaced contact points distributed over its periphery with contact area regions on the moulding, and in which one of the two coupling components is secured to the core of the coil, and the other coupling component is a component of the rotary support. The moulding is rigidly dimensionally stable while the annular first coupling component is made of a flexible material. On the occurrence of a relative movement between the two coupling components, the moulding continually deforms the annual coupling component via the contact points.

17 Claims, 4 Drawing Sheets

FRICTION COUPLING FOR THE TORQUE-LIMITING TRANSMISSION OF FORCE BETWEEN A COIL CORE FOR WINDING OR UNWINDING A TAPE AND A ROTARY SUPPORT

BACKGROUND

1. Field of the Invention

This invention relates to a slipping clutch for the torque-limiting transmission of force between a spool core of a spool for the winding and unwinding of a tape and a rotary support for said spool core.

2. Discussion of the Related Art

Slipping clutches of the type in question are widely used, above all in accessories for the home and office, for example for adhesive tape dispensers or for transfer dispensers. Transfer dispensers are hand-held devices for transferring a film, for example an adhesive film or a cover-up film, from a carrier tape to a substrate, the carrier tape being wound onto a feed spool inside the dispenser and being guided from the feed spool to a so-called applicator foot projecting from the dispenser where it reverses direction and returns to a take-up spool inside the dispenser. The film-coated carrier tape can be pressed onto a substrate via the applicator foot so that the film layer is separated from the carrier tape in conjunction with the reversal of direction of the tape and transferred to the substrate while the empty carrier tape is returned to the take-up spool inside the dispenser. The feed spool, take-up spool and applicator foot are often combined in a cassette. The feed spool and take-up spool may be arranged coaxially of or axially parallel to one another in the housing of the dispenser.

The slipping clutches mentioned above are used either in transfer dispensers to drive the take-up spool from the feed spool, which is driven by take-off of the tape, with the slipping clutch in between. The slipping clutch compensates for the equalization of speed between the feed spool and the take-up spool which is necessary for building up the tape tension that must be maintained. However, slipping clutches may also be used in dispensers where only one spool (i.e. the feed spool) is designed to rotate freely in the housing, the user offwinding the tape (for example an adhesive tape) as required for removal, to provide the freely rotating spool with a required brake torque in order to maintain a certain tape tension, for example during offwinding of the tape (i.e. dispensing of the tape for wrapping purposes), or even to prevent the feed spool from unwinding too quickly in the event of a slightly stronger pull by the user or from undesirably overrotating at the end of the removal process.

In known dispensers, slipping clutches of the type in question assume different forms. In the dispenser disclosed in DE-A-40 34 145, the feed spool and the take-up spool are connected to one another by a flat belt drive which travels over belt pulleys and which acts solely by friction. The tension of the belt drive is adapted to the required slipping torque, the slip coming in when the brake force determining the tension required for the carrier tape is reached at the take-up spool.

DE-A-39 00 156 describes a slipping clutch which operates on the principle of a magnetic clutch and in which a magnetic disc is used on the drive side and a steel disc on the driven side. The slipping torque is determined by the attractive force between the magnetic disc and the steel disc and the resulting friction.

According to EP-A-0 556 406, the take-up spool is press-fitted via a friction sleeve onto a shaft driven directly from the feed spool via a gear. The contact pressures or rather forces are selected so that slip comes in when the required tape tension is reached or when the corresponding brake torque is generated at the take-up spool.

U.S. Pat. No. 4,891,090 describes another slipping clutch in which one part of the clutch in the form of a shaped element is provided with several resilient plastic arms arranged in the shape of a star which press against and engage by friction with the inner wall of another part of the clutch in the form of an annular sleeve. The contact pressure of the arms and the friction pairing of their constituent material and that of the annular sleeve determine the transmittable torque or rather the slipping moment.

All the slipping clutches mentioned are designed in principle as friction clutches so that the magnitude of the slipping moment is always determined by the actual frictional resistance between the parts rubbing against one another. In the case of transfer dispensers, the tape resistance at which slip occurs must be at least slightly greater than the force which is necessary to guide the carrier tape over the applicator element under the requisite tension, to separate the adhesive layer applied and to rewind the carrier tape onto the take-up spool. On the other hand, however, the torque at which slip occurs must not exceed the cohesive force of the coating (for example adhesive layer) applied to the carrier tape because this would lead to tearing of the film so that transport of the tape would stop and blockage would ultimately occur. In addition, the leverage acting on the take-up spool would increase with increasing wind-on radius so that the slip of the clutch would have to be gauged in such a way that even the final section of the carrier tape to be wound onto the take-up spool could still be safely wound on.

In the known slipping clutches, the main influencing factor is the frictional force between the workpieces rubbing against one another. It is dependent to a large extent, for example, on the abrasion behavior or behavior under pressure of the parts sliding on one another. Even if only minimal abrasion occurs in the practical application of a dispenser, the contact pressure applied to the friction surface will diminish considerably unless the various parts are under spring tension, with the result that the friction force and the hence the slipping moment will also decrease. However, if resilient, for example elastically deformed, parts are used to apply pressure to the parts rubbing against one another, as is the case with the dispenser known from U.S. Pat. No. 4,891,090, the level of tension will fall to a certain extent over the life of the dispenser due to the viscoelastic behavior of the plastics used for the resilient parts. The loading of permanently resiliently deformed plastic springs should be comparatively small to prevent them from being overly permanently deformed with time. So far as the slipping clutches in question are concerned, however, this means that they are capable for a limited time of transmitting the torque for which they were designed and which is required for the smooth operation of a transfer dispenser or the like. This, in conjunction with the brake torque likewise increasing with increasing winding radius of the take-up spool, means that, in order to ensure winding up to the end of a tape, a comparatively large slipping moment has to be taken into account at the beginning of the tape's life in order to guarantee sufficient pull when the take-up spool is almost completely full at the end of the tape's useful life.

SUMMARY OF THE INVENTION

With the problems of the prior art in mind, an object of the present invention is to provide a slipping clutch of the type mentioned above that, despite simple assembly and an uncomplicated structure, insures little change in the maximum transmittable torque (slipping torque), even over a relatively long period of use.

In a slipping clutch of the type mentioned above, the solution to this problem as provided by the invention is characterized in that the shaped element is a rigid dimensionally stable moulding while an annular first clutch part consists of a flexible material and in that, in the event of relative movement between the two clutch parts, the shaped element deforms the annular clutch part all round via the contact points.

Whereas, in known slipping clutches, the slipping moment is determined solely by the adhesive friction force occurring in the sliding surface of the clutch parts sliding on one another, its magnitude in the slipping clutch according to the invention is critically determined by mechanical work to be continually done due to the continuous energy-consuming deformation process, the friction forces occurring at the same time between the parts moved relative to one another making only a comparatively small contribution. Fatigue does not occur as rapidly as in the permanently loaded plastic springs of the known slipping clutch because the counter-element (annular first clutch part) continuously deformed by the shaped element is locally subjected to and freed from load in a continuous cycle and is even deformed or loaded in the opposite direction (i.e. in the area between two deformation sites) which produces a totally different load situation in relation to plastic springs permanently pretensioned in one direction only. Since continually changing deformations occur at each point of the annular clutch part of the slipping clutch according to the invention in the event of a movement relative to the shaped element and, in contrast to the known slipping clutch, do not produce a state of inertia, not only the useful life but also the serviceability of the slipping clutch according to the invention are considerably increased as a result. In the case of transfer dispensers with a replacement cassette, this enables the clutch part permanently deformed in use to be arranged in the cassette and, at the same time, only the non-deformed parts which undergo little, if any, fatigue to be fixedly arranged in the housing so that, whenever a cassette is changed, the deformed parts are always replaced and, when a new cassette is inserted, are also present in new form. Accordingly, in the slipping clutch according to the invention, distinctly improved, full serviceability can be achieved through a considerably longer useful life than in the case of the known slipping clutch which is also of particular importance for dispensers with replacement cassettes. However, even if no replacement cassettes are used or if the dispenser is one where only a continuous brake torque is to be applied to pushed-on spools (as in the case of an adhesive tape dispenser), a distinctly smaller change in the magnitude of the slipping moment occurs over the life of the dispenser than in the case of the known dispensers operating solely by friction.

In the slipping clutch arrangement according to the invention, the rotary support may be fixed to the housing as a pure holding shaft, in which case the slipping clutch enables a brake torque to be applied to a pushed-on spool. However, the rotary support may be also connected as a rotatable shaft to a second spool either directly or through a gear assembly when the feed spool is accompanied in the housing by a take-up spool, as is typically the case with transfer dispensers.

In one preferred embodiment of the slipping clutch according to the invention, the annular clutch part has a circular cross-section before it is fitted together with the shaped element. After assembly or rather after the two clutch parts have been fitted together, this circular cross-section is deformed into a non-circular cross-section. The annular clutch part is preferably a cylindrical sleeve which provides for a particularly simple, easy-to-produce and easy-to-assemble construction.

In another advantageous embodiment of the invention, the shaped element is arranged coaxially inside the annular clutch part. In this embodiment, the shaped element is preferably formed by a substantially cylindrical moulding which is formed on its outer circumference with at least two axially extending ridge-like projections which project towards and are in contact with the inner circumference of the annular clutch part. At the same time, they slightly extend the annular clutch part at their contact points, i.e. their contact surface zones through which they bear against the inner circumference of the annular clutch part lie on a circle with a diameter larger by a suitable amount than the internal diameter of the annular clutch part before its assembly.

Another advantageous embodiment of the invention is characterized in that the shaped element is formed by a rotary part of substantially polygonal cross-section of which the corners are rounded and, with the annular clutch part, form the contact surface zones in pressure contact. In this embodiment, the contact surface zones lie on a radius slightly larger than the inner radius of the annular clutch part in its pre-assembly state.

In another preferred embodiment of the slipping clutch according to the invention, the shaped element may also consist of a rotatable wheel rim with carrier arms at the ends of which are mounted freely rotatable rollers that form the contact surface zones in contact with the annular clutch part. This embodiment of the slipping clutch according to the invention, which is slightly more complicated and elaborate than the other embodiments described in the foregoing, affords the major advantage that the influence of friction on the magnitude of the slipping moment is even further reduced because, in this case, only the rolling friction which is far smaller than the sliding friction forms the corresponding friction force component.

In the slipping clutch according to the invention, the contact points may be distributed in any suitable form over the circumference of the annular clutch part. In a particularly preferred embodiment, however, they are uniformly distributed over this circumference.

In another advantageous embodiment of the invention, the annular clutch part is arranged coaxially inside the shaped element, in which case the shaped element is preferably formed by a substantially cylindrical annular sleeve formed on its inner circumference with at least two ridge-like projections which are rounded at their free ends and which extend longitudinally of the sleeve, projecting towards and being in pressure contact with the outer circumference of the annular clutch part arranged inside them. In this embodiment the radial inner ends of the projections lie on a radius which is smaller by a suitable amount than the outer radius of the inner annular first clutch part.

In a particularly preferred variant of the embodiment just described, another second rigid and dimensionally stable shaped element is coaxially disposed inside the annular clutch part and, through at least two projections distributed over its circumference, is in contact with the inner circumference of the annular clutch part at contact points in such a way that, in the event of a relative movement between the second shaped element and the annular clutch part, the second shaped element deforms the annular clutch part radially outwards. The contact points as formed are peripherally offset in relation to those between the annular clutch part and the other first shaped element which lies radially outside the annular clutch part with one shaped element being connected to the spool core of the spool and the other being connected to the spool core of another spool.

In another preferred embodiment of the slipping clutch according to the invention, the annular clutch part—where two spools are present—is connected to the spool core of one spool. The shaped element is connected to the spool core of another spool. A transmission gear is preferably provided between one or the other clutch part and the associated spool core.

Where two spools are present, the one driving the other through the slipping clutch, the shaped element is preferably connected to the spool core of the driving spool, for example as a corresponding shaped element projecting concentrically to the driving spool.

The annular clutch part preferably represents the spool core of the driven spool itself. However, the annular clutch part may be connected to an associated spool core in the form in which it is an annular sleeve projecting laterally and coaxially of the spool core.

The annular clutch part continuously deformed when the two clutch parts move relative to one another may consist of any suitable material provided it has the necessary flexural deformability (while the peripheral length of the annular clutch part is not supposed to change, even during its deformation). It may advantageously be made of such materials as paperboard or a suitable flexurally deformable plastic.

BRIEF DESCRIPTION OF THE DRAWINGS

The invention is described in more detail in the following with reference to the accompanying drawings, in which like items are identified by the same reference designation wherein.

Figure 1:
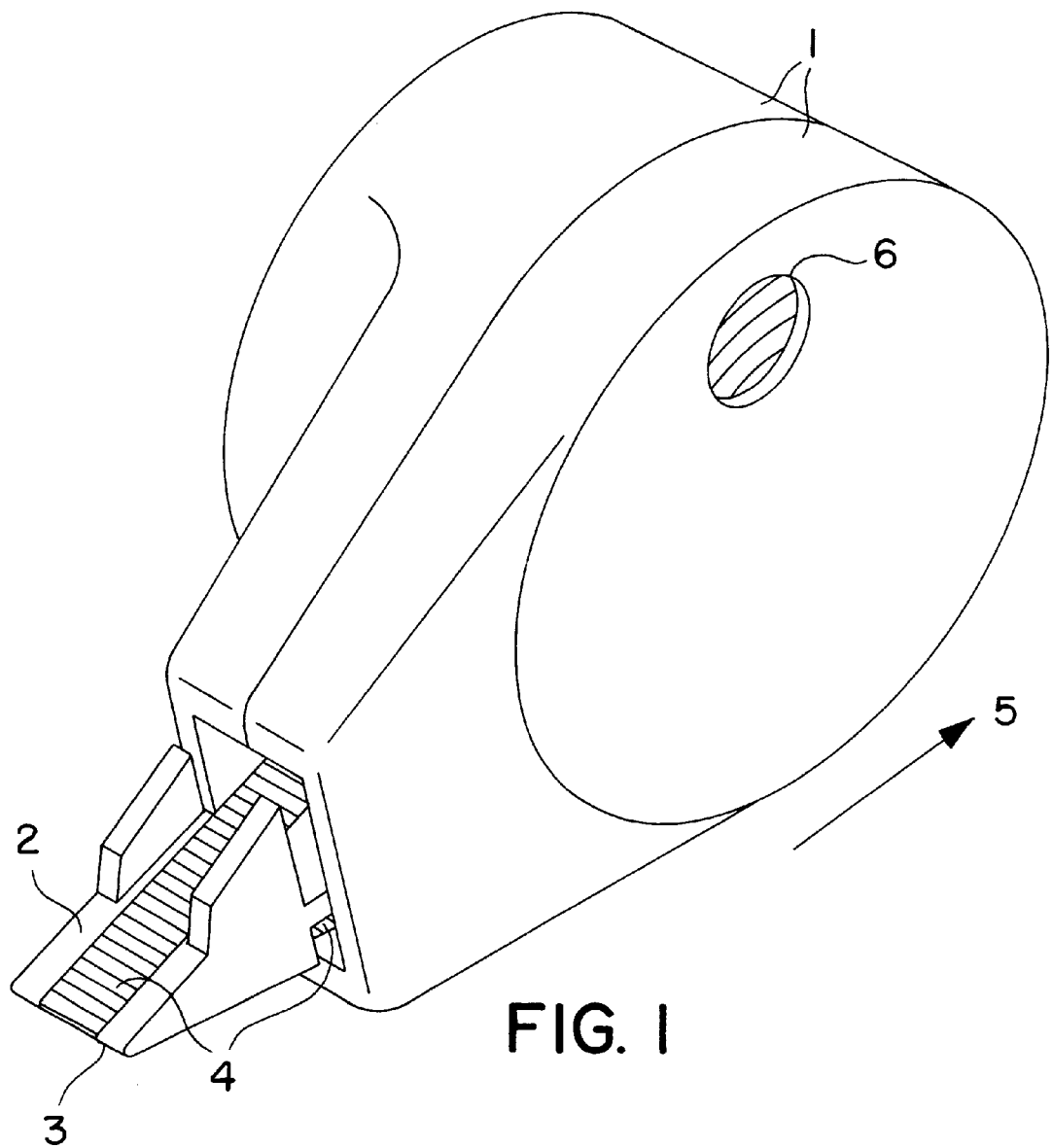
FIG. 1 is a schematic three-quarter view of a transfer dispenser in which a slipping clutch according to the invention is used.
Figure 2:
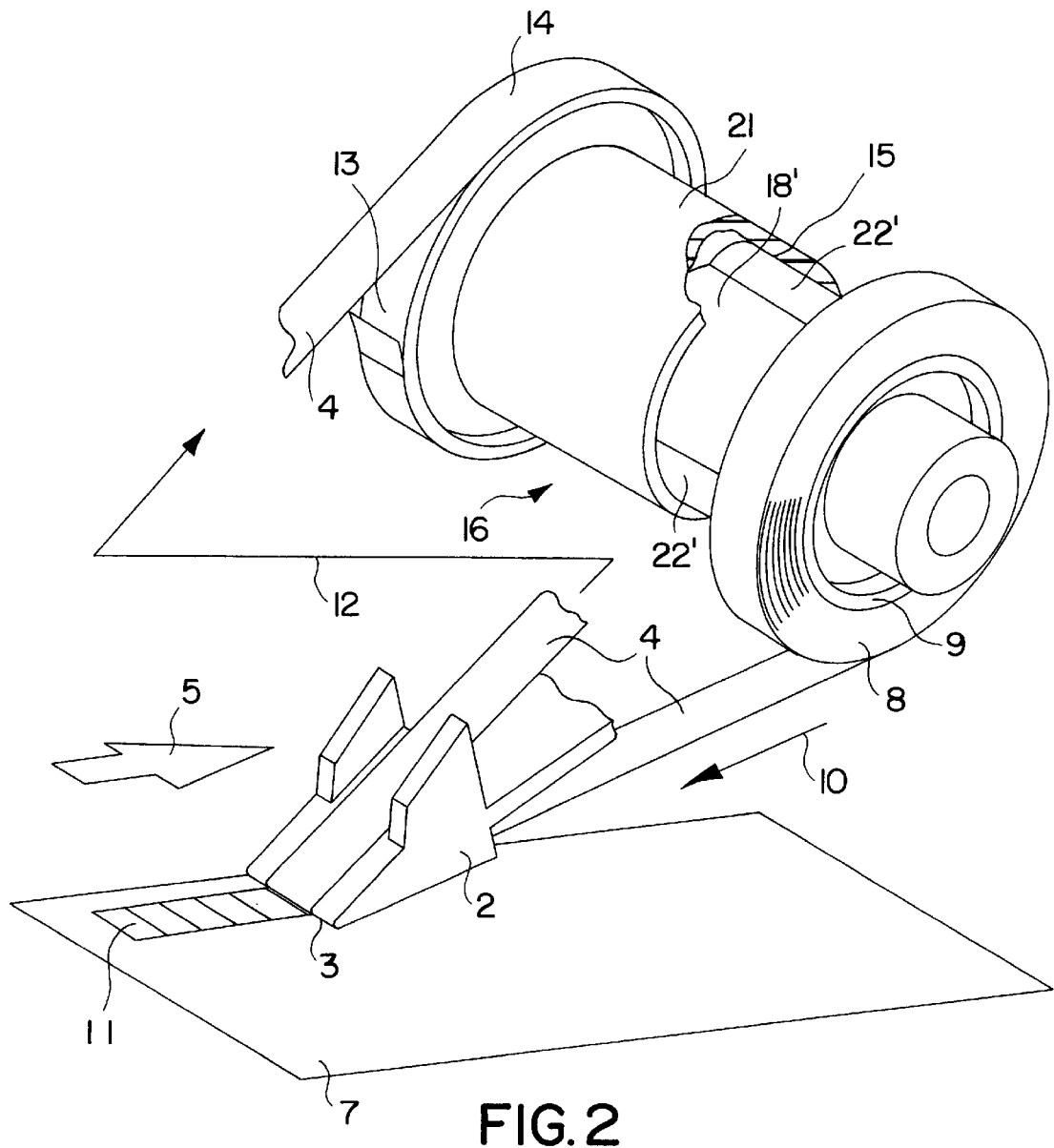
FIG. 2 is an exploded perspective view of the interior of the transfer dispenser shown in FIG. 1 with one embodiment of a slipping clutch according to the invention (partly cut away).

The transfer dispenser shown in FIGS. 1 and 2 comprises a housing 1 essentially in the form of a compact cylinder from one side of which projects a substantially radial housing extension with an opening through which extends an outwardly projecting applicator element 2 which, at its free end, forms an applicator nib 3. A carrier tape 4 passes out of the housing 1 over the underside of the applicator element 2 where it suddenly changes direction upwards and finally re-enters the housing via the top of the applicator element 2 when the housing or rather the applicator nib 3 is moved over a substrate 7 (FIG. 2) in the direction of the arrow 5 (FIG. 1).

As shown in FIG. 2, the carrier tape 4 travels from a supply roll 8 mounted on a feed spool core 9 to the applicator nib 3 of the applicator element 2 in the direction of the arrow 10. An adhesive film is applied to the carrier tape 4. In FIG. 2, the adhesive film is situated on the underside of the section of the carrier tape coming from the supply roll 8. By pressing the applicator nib 3 of the dispenser onto the substrate 7 in conjunction with the change in direction of the carrier tape 4, the adhesive film is transferred from the carrier tape 4 to the substrate in the form of an adhesive coating 11. The amount of tape left on the supply roll 8 can be determined through the inspection hole 6 in the housing 1.

The carrier tape 4 re-entering the housing 1 on the upper side of the applicator element 2 is wound in the direction of arrow 12 onto the core 13 of a take-up spool to form a roll 14.

As can be seen from the drawings, the external diameter of the spool core 13 of the take-up spool is slightly larger than the diameter of a new supply roll 8 so that, through the coaxial arrangement of the spool cores 9 and 13 of the feed and take-up spools, the rotation of both the spools 9 and 13 at always the same speed means that, on the outer circumference of the roll 14 of carrier tape 4 on the spool core 13 of the take-up spool, there is always a tendency there to wind on a slightly longer length of carrier tape 4 than the length offwound from the supply roll 8. In order to equalize the resulting differences in speed, a driving connection between the spool core 13 of the take-up spool and the spool core 9 of the feed spool is established by a slipping clutch 16.

In this slipping clutch 16, the spool core 9 is suitably provided (not shown in FIG. 2) with a coaxial annular stub 18' which projects towards the take-up spool and which, on its outer circumference, carries two ridge-like projections 22' offset through 180° from one another and extending axially of the stub 18'. The laterally projecting, substantially cylindrical stub 18' in conjunction with the two projecting ridges 22' forms a shaped element in the form of a rigid dimensionally stable moulding that constitutes one part of the clutch.

Suitably connected to the spool core 13 of the take-up spool is a similarly lateral, coaxial stub 21 in the form of an annular sleeve 21 which projects towards the feed spool and which forms a second part of the clutch into which the first part (shaped element)—consisting of the stub 18' and the projections 22'—coaxially projects. The radially outermost boundaries of the projections 22' lie on a diameter which is slightly larger than the diameter of the annular clutch part 21 before assembly.

The annular clutch part 21 is made of a flexible material, i.e. a material which, during assembly, is slightly bent radially outwards from inside by the projections 22', but without any change in the length of the outer circumference or inner circumference of the annular clutch part 21. If the stub 18' with the projections 22' is inserted laterally and coaxially into the annular clutch part 21, the annular clutch part 21—which has a circular cross-section before assembly—is locally bent radially outwards by the projections 22' so that, after assembly, its cross-section is no longer circular, but oval or elliptical. The cylindrical sleeve-like clutch part 21 may be made, for example, of a suitable paperboard or even a suitable plastic which has the necessary flexibility.

If in the practical application of the dispenser with the friction clutch 16 in the form shown in FIG. 2 the spool core 9 of the feed spool is rotated by the carrier tape 4 offwound from its supply roll 8, the carrier tape 4 is first placed under tension between the two spools. When the carrier tape 4 reaches a predetermined tension, the slipping moment in the slipping clutch 16 is exceeded, resulting in a relative movement between the shaped element consisting of the parts 18' and 22' on the one hand and the second clutch part in the form of the annular sleeve 21 on the other hand. This relative movement between the two parts of the clutch is accompanied by continuous deformation of the cylindrical sleeve 21 by the projections 22'. In conjunction with the friction forces generated at the contact points 15, the deformation functions to provide a loss of energy which produces a braking moment between the two clutch parts moved relative to one another.

Other embodiments of the slipping clutch 16 are shown in FIGS. 3 to 6 which are each radial sections through the clutch 16 formed by the two clutch parts.

Figure 3:
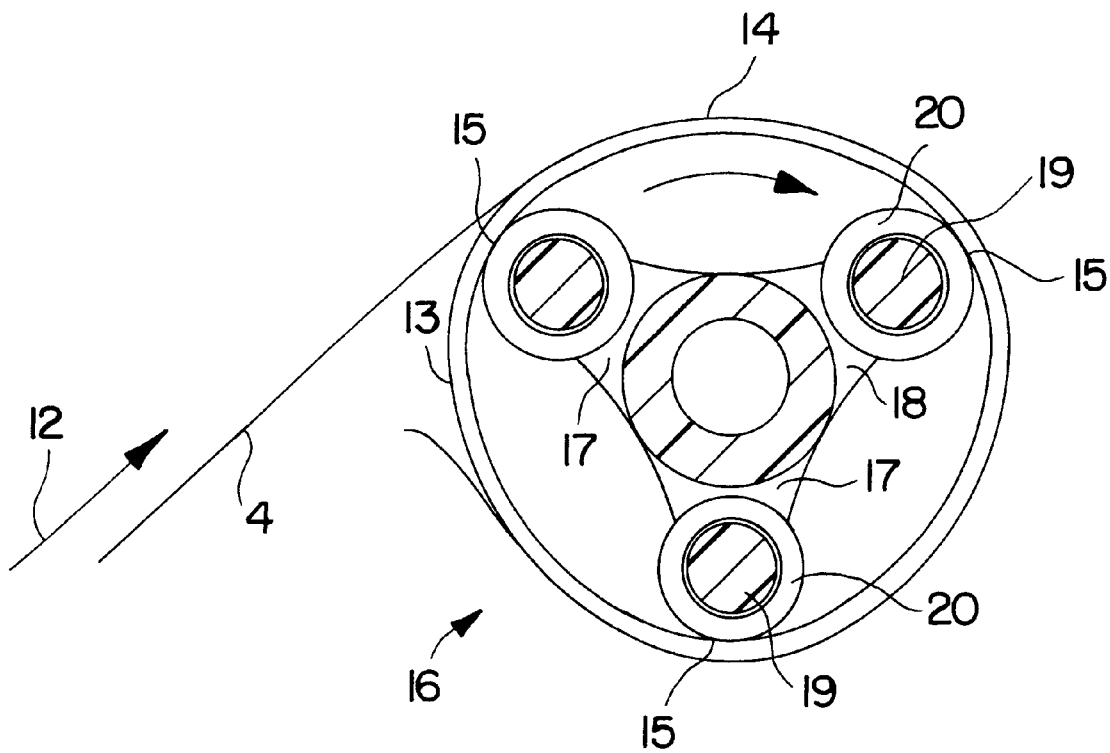
FIG. 3 is a schematic view, partly in section, of another embodiment of a slipping clutch according to the invention.
Figure 4:
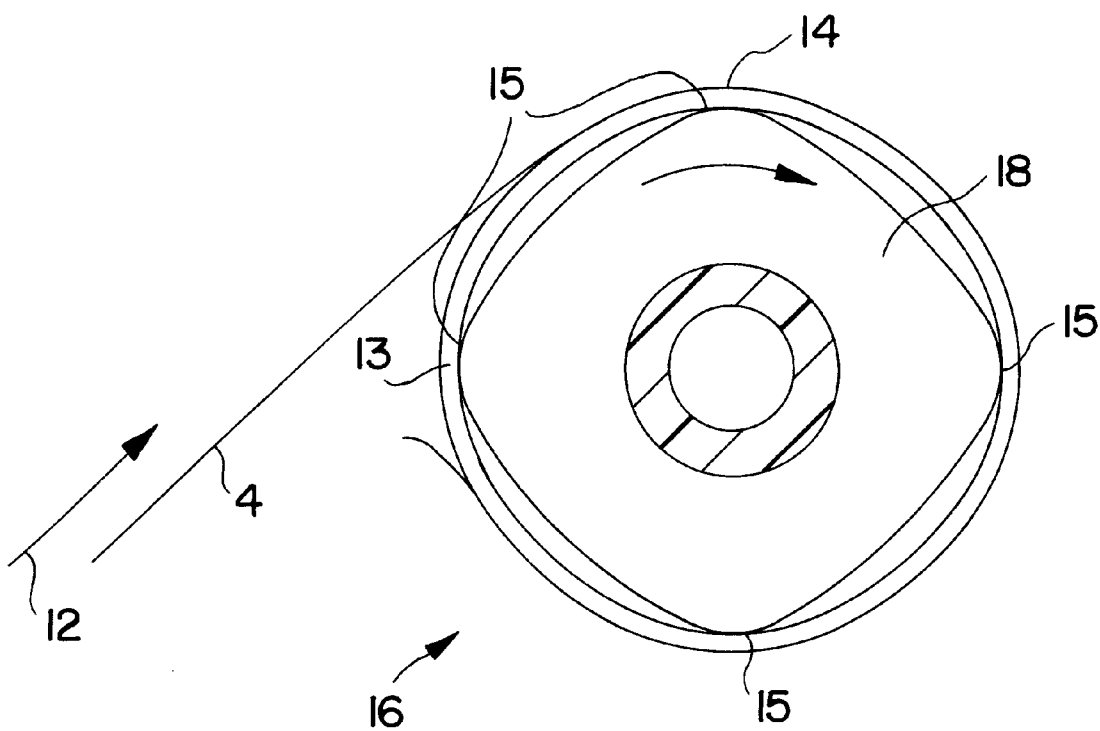
FIG. 4 is a view similar to FIG. 3 of a further embodiment of a slipping clutch according to the invention.
Figure 5:
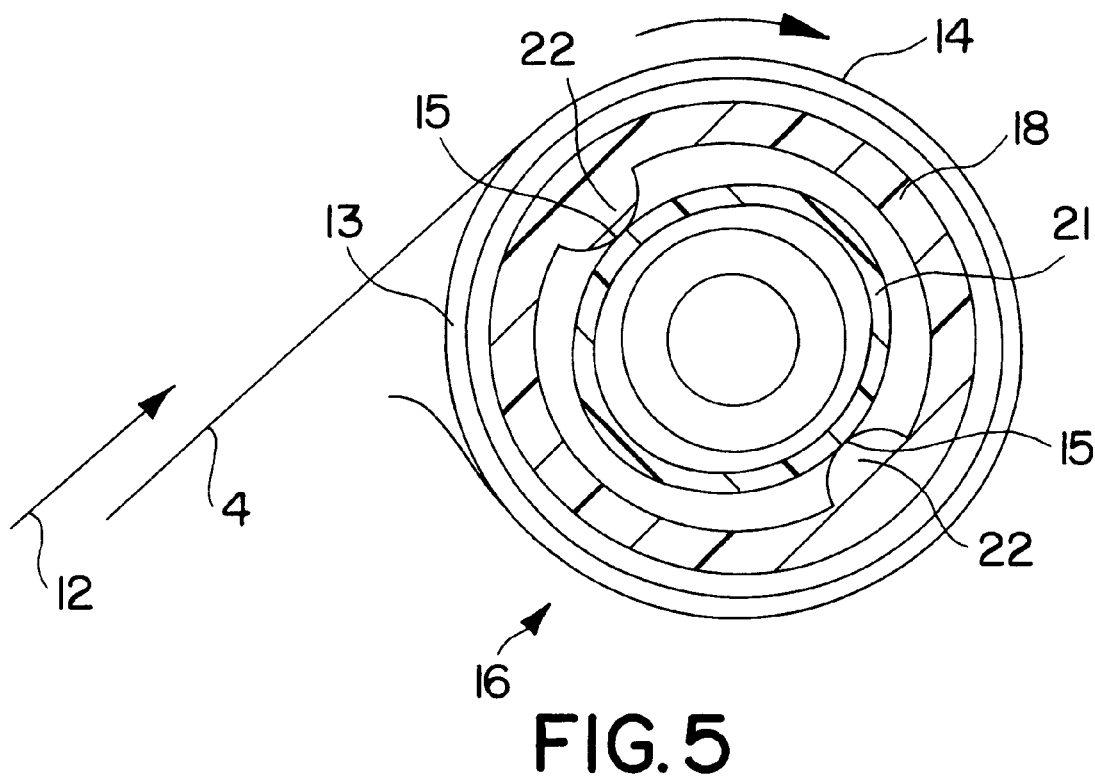
FIG. 5 is a view similar to FIGS. 3 and 4 of another embodiment of a slipping clutch according to the invention.
Figure 6:
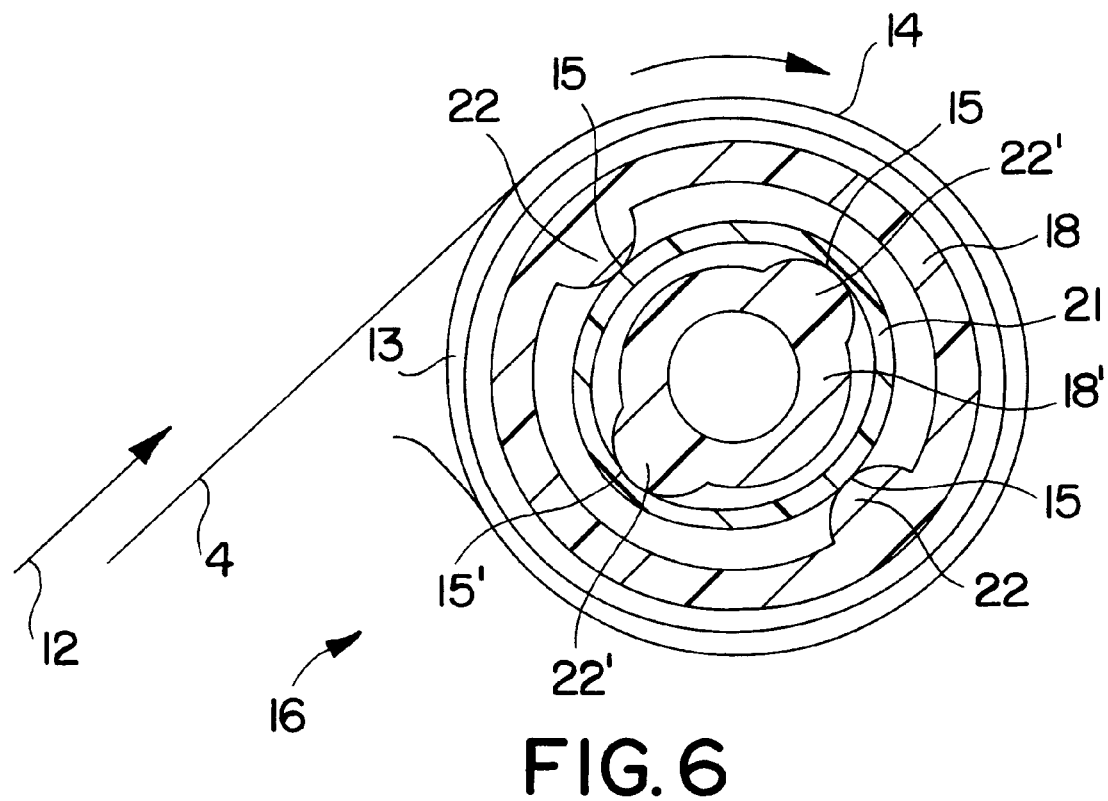
FIG. 6 is a view similar to FIGS. 3 to 5 of yet another embodiment of a slipping clutch according to the invention.

In the embodiment shown in FIGS. 3 and 4, the second clutch part in the form of a moulding is disposed coaxially in the first annular clutch part 13 whereas, in the embodiments shown in FIGS. 5 and 6, the arrangement is reversed.

In the embodiment shown in FIG. 3, the moulding 18 consists of a carrier rim arranged in the shape of a star with carrier arms 17 which project radially outwards and which, at their radially outer ends, comprise rollers 20 designed to rotate freely about pivot pins 19. The contact points 15 between the moulding 18 and the first annular clutch part 13 are created by the points of contact between the rollers 20 and the inner circumference of the annular clutch part 13.

FIGS. 3 and 4 show embodiments of the slipping clutch 16 in which the spool core 13 of the take-up spool itself forms the annular first clutch part. Equally, however, this function could also be performed by an extension (for example differing in diameter from the spool core) suitably arranged on the side of the spool core 13, for example as illustrated in FIG. 2.

The only difference in the embodiment shown in FIG. 4 in relation to that shown in FIG. 3 is that the shaped element 18 is formed by a rotary part of substantially polygonal— here square—cross-section with sides curved slightly outwards, the corners of the polygon being rounded and bearing against the annular first clutch part 13 through the contact points 15. The circle on which the rounded corners of the polygon lie is slightly larger than the circle formed by the cross-section of the annular clutch part 13 in the pre-assembly state.

In the embodiments shown in FIGS. 5 and 6, the spool core of the take-up spool 13 is connected to the shaped element 18 which is substantially in the form of an annular sleeve which, on its inner circumference, has two inwardly projecting ridges 22 (similar to the ridges 22' in FIG. 2, but directed radially inwards) which extend axially of the element 18. The shaped element 18 is supported by the projections 22 on the sleeve-like coupling part 21 which is disposed in its interior and which is suitably connected (not shown in FIG. 5) to the spool core (likewise not shown in FIG. 5) of the take-up spool. In the event of a relative movement between the moulding 18 and the clutch part 21, the clutch part is deformed radially inwards from outside because the circle on which radially the innermost points of the projections 22 lie has a somewhat smaller diameter than the outer circumference of the annular clutch part 21 in its relaxed state before insertion into the interior of the shaped element.

The only difference in the embodiment shown in FIG. 6 in relation to that shown in FIG. 5 is that a second shaped element 18' is again disposed in the annular sleeve 21. The second shaped element 18' consists of a substantially cylindrical moulding which, like the shaped element 18' in FIG. 2, is provided on its outer circumference with axially extending outwardly directed projections 22'. With the inner circumference of the annular sleeve 21, the projections 22' form contact points 15' which are radially offset from the contact points 15 between the shaped element 18 and the annular sleeve 21 in such a way that the offset amounts to half the angle between two consecutive projections, i.e. the offset angle in FIG. 6 is 90°. In this case, it is not the annular sleeve 21 but the second shaped element 18' which is connected to the spool core of the take-up spool, the annular sleeve 21 here only forming an elastic support between the two dimensionally stable shaped elements 18 and 18' inside the slipping clutch 16.

The number of contact points 15 and radial projections 22 and 22' may also differ in relation to the illustrated embodiments where two contact points 15 (FIGS. 5 and 6), three contact points (FIG. 3) and four contact points 15 (FIG. 4) are shown. However, a different number of contact points may also be provided.

Purely for the sake of completeness it is pointed out that the slipping clutch 16 as illustrated in the drawings could equally be used in such a way that, for example, the shaped element 18 is rigidly fixed to one side wall of the dispenser housing 1 while the spool core 13 forms the core of a feed spool which, for example, carries an adhesive tape designed to be offwound by the user, for example for wrapping purposes. In this way, the whole forms a slipping clutch in the sense that a braking torque is applied to an otherwise freely rotatable feed spool. Conversely, the freely rotatable spool could of course also be coupled to the rigid shaped element 18 while the deformable annular sleeve 13 projects from the housing.

Although various embodiments of the invention have been shown and described, they are not meant to be limiting. Those of skill in the art may recognize certain modifications to these embodiments, which modifications are meant to be covered by the spirit and scope of the appended claims.

What is claimed is:

1. In a device wherein a tape is supplied by a feed spool on a feed spool core and the tape is taken up by a take-up spool on a take-up spool core, a slipping clutch for the torque-limiting transmission of force between the feed spool core of the feed spool and the take-up spool for the winding and unwinding of the feed tape from the feed spool core and to the take-up spool core, the slipping clutch comprising a first clutch part of annular cross-section and a second clutch part in the form of a shaped element the improvement being in that, the annular clutch part engaging by friction at several contact points spaced apart from one another around its circumference with associated contact surface zones formed on the shaped element and one of the two clutch parts being connected to the feed spool core of the feed spool, and the other clutch part being connected to the take-up spool core, the shaped element is a rigid dimensionally stable moulding while the annular first clutch part consists of a flexible material, whereby in the event of relative movement between the two clutch parts, the shaped element deforms the annular clutch part via the contact points.

2. The device clutch as claimed in claim 1, wherein the annular clutch part has a circular cross-section which, after the two clutch parts have been fitted together, is deformed into a non-circular cross-section.

3. The device as claimed in claim 1, wherein the annular clutch part is in the form of a cylindrical sleeve.

4. The device as claimed in claim 1, wherein the shaped element is arranged coaxially inside the annular clutch part.

5. The device as claimed in claim 1, wherein the contact points are uniformly distributed over the circumference of the annular clutch part.

6. The device as claimed in claim 1, wherein the annular clutch part is disposed coaxially inside the shaped element.

7. The device as claimed in claim 6, wherein the shaped element is formed by a substantially cylindrical annular sleeve formed on its inner circumference with at least two projections which are rounded at their free ends and which extend longitudinally of the sleeve, projecting towards and being in pressure contact with the outer circumference of the annular clutch part.

8. The device as claimed in claim 1, wherein the annular clutch part is made of paperboard.

9. The device as claimed in claim 1, wherein the annular clutch part is made of flexurally deformable plastic.

10. A device as claimed in claim 1 wherein an adhesive film is on the tape, the device including an applicator member in the path of motion of the tape between the feed spool and the take-up spool whereby the adhesive film separates from the tape as the tape passes around the applicator member to be transferred to a substrate.

11. A slipping clutch for the torque-limiting transmission of force between a spool core of a spool for the winding and unwinding of a tape and a rotary support for said spool core, comprising a first clutch part of annular cross-section and a second clutch part in the form of a shaped element, the annular clutch part engaging by friction at several contact points spaced apart from one another around its circumference with associated contact surface zones formed on the shaped element and one of the two clutch parts being connected to the spool core of the spool, and the other clutch part forming part of the rotary support, wherein the shaped element is a rigid dimensionally stable moulding while the annular first clutch part consists of a flexible material, whereby in the event of relative movement between the two clutch parts, the shaped element deforms the annular clutch part via the contact points, wherein the shaped elements are arranged coaxially inside the annular clutch part, wherein the shaped element being formed by a substantially cylindrical moulding which is formed on its outer circumference with at least two axially extending, rounded projections which project towards the inner circumference of the annular clutch part and which form the contact points.

12. A slipping clutch for the torque-limiting transmission of force between a spool core of a spool for the winding and unwinding of a tape and a rotary support for said spool core, comprising a first clutch part of annular cross-section and a second clutch part in the form of a shaped element, the annular clutch part engaging by friction at several contact points spaced apart from one another around its circumference with associated contact surface zones formed on the shaped element and one of the two clutch parts being connected to the spool core of the spool, and the other clutch part forming part of the rotary support, wherein the shaped element is a rigid dimensionally stable moulding while the annular first clutch part consists of a flexible material, whereby in the event of relative movement between the two clutch parts, the shaped element deforms the annular clutch part via the contact points, wherein the shaped elements are arranged coaxially inside the annular clutch part, and the shaped element being formed by a rotary part of substantially polygonal cross-section of which the corners are rounded and, with the annular clutch part, form the contact points in pressure contact.

13. A slipping clutch for the torque-limiting transmission of force between a spool core of a spool for the winding and unwinding of a tape and a rotary support for said spool core, comprising a first clutch part of annular cross-section and a second clutch part in the form of a shaped element, the annular clutch part engaging by friction at several contact points spaced apart from one another around its circumference with associated contact surface zones formed on the shaped element and one of the two clutch parts being connected to the spool core of the spool, and the other clutch part forming part of the rotary support, wherein the shaped element is a rigid dimensionally stable moulding while the annular first clutch part consists of a flexible material, whereby in the event of relative movement between the two clutch parts, the shaped element deforms the annular clutch part via the contact points, wherein the shaped elements are arranged coaxially inside the annular clutch part, and the shaped element including a rotatable wheel rim with carrier arms at the ends of which are mounted freely rotatable rollers that form the contact points in contact with the annular clutch part.

14. A slipping clutch for the torque-limiting transmission of force between a spool core of a spool for the winding and unwinding of a tape and a rotary support for said spool core, comprising a first clutch part of annular cross-section and a second clutch part in the form of a shaped element, the annular clutch part engaging by friction at several contact points spaced apart from one another around its circumference with associated contact surface zones formed on the shaped element and one of the two clutch parts being connected to the spool core of the spool, and the other clutch part forming part of the rotary support, wherein the shaped element is a rigid dimensionally stable moulding while the annular first clutch part consists of a flexible material, whereby in the event of relative movement between the two clutch parts, the shaped element deforms the annular clutch part via the contact points, the annular clutch part being disposed coaxially inside the shaped element the shaped element being formed by a substantially cylindrical annular sleeve formed on its inner circumference with at least two projections which are rounded at their free ends and which extend longitudinally of the sleeve, projecting towards and being in pressure contact with the outer circumference of the annular clutch part, further including another rigid and dimensionally stable shaped element coaxially disposed inside the annular clutch part and, through at least two projections distributed over its circumference, is in contact with the inner circumference of the annular clutch part at contact points in such a way that, in the event of a relative movement between the second shaped element and the annular clutch part, the second shaped element deforms the annular clutch part radially outwards via the contact points, all the contact points being peripherally offset in relation to those between the annular clutch part and the other shaped element and one shaped element being connected to the spool core of the spool, and the other shaped element being connected to the spool core of another spool.

15. A slipping clutch for the torgue-limiting transmission of force between a spool core of a spool for the winding and unwinding of a tape and a rotary support for said spool core, comprising a first clutch part of annular cross-section and a second clutch part in the form of a shaped element, the annular clutch part engaging by friction at several contact points spaced apart from one another around its circumference with associated contact surface zones formed on the shaped element and one of the two clutch parts being connected to the spool core of the spool, and the other clutch part forming part of the rotary support, wherein the shaped element is a rigid dimensionally stable moulding while the annular first clutch part consists of a flexible material, whereby in the event of relative movement between the two clutch parts, the shaped element deforms the annular clutch part via the contact points, and the annular clutch part being connected to the spool core of the spool while the shaped element is connected to the spool core of another spool.

16. A slipping clutch as claimed in claim 15, wherein one of the two spools drives the other via the slipping clutch, wherein the shaped element is connected to the spool core of the driving spool.

17. A slipping clutch as claimed in claim 16, wherein the annular clutch part is the spool core of the driven spool.

\* \* \* \* \*

UNITED STATES PATENT AND TRADEMARK OFFICE
CERTIFICATE OF CORRECTION

PATENT NO.    : 6,145,770
DATED         : November 14, 2000
INVENTOR(S)   : Manusch et al.

It is certified that error appears in the above-identified patent and that said Letters Patent is hereby corrected as shown below:

Column 10,
Line 58, delete "torgue-limiting", and insert therefor -- torque-limiting --

Signed and Sealed this

Fifteenth Day of April, 2003

JAMES E. ROGAN
*Director of the United States Patent and Trademark Office*